(12) United States Patent
Stadlbauer et al.

(10) Patent No.: US 7,507,386 B2
(45) Date of Patent: Mar. 24, 2009

(54) CATALYTIC REACTOR

(75) Inventors: Ernst A. Stadlbauer, Biebertal (DE); Walter Grimmel, Obert-Moerlen (DE)

(73) Assignee: Werkstoff & Funktion Grimmel Wassertechnik GmbH, Ober-Moerlen (DE)

( * ) Notice: Subject to any disclaimer, the term of this patent is extended or adjusted under 35 U.S.C. 154(b) by 203 days.

(21) Appl. No.: 10/546,102

(22) PCT Filed: Feb. 20, 2004

(86) PCT No.: PCT/DE2004/000329

§ 371 (c)(1),
(2), (4) Date: Jun. 13, 2006

(87) PCT Pub. No.: WO2004/074181

PCT Pub. Date: Sep. 2, 2004

(65) Prior Publication Data
US 2007/0003459 A1    Jan. 4, 2007

(30) Foreign Application Priority Data
Feb. 20, 2003  (DE) ................. 103 07 438
Aug. 20, 2003  (DE) ................. 103 38 916

(51) Int. Cl.
*B01J 8/08*  (2006.01)

(52) U.S. Cl. ................... 422/219; 422/198

(58) Field of Classification Search .......... 422/219, 422/198
See application file for complete search history.

(56) References Cited

U.S. PATENT DOCUMENTS

| 1,881,826 | A |  | 10/1932 | McQuade |
| 4,781,796 | A |  | 11/1988 | Bridle et al. |
| 5,078,836 | A |  | 1/1992 | Hogan |

FOREIGN PATENT DOCUMENTS

| DE | 646 182 |  | 6/1937 |
| DE | 32 18 359 A1 |  | 11/1983 |
| DE | 33 23 675 A1 |  | 2/1985 |
| EP | 0 807 461 |  | 11/1997 |
| EP | 1 052 279 |  | 11/2000 |
| GB | 2116864 A | * | 10/1983 |
| JP | 2002327180 A |  | 11/2002 |
| WO | WO 03/064562 |  | 8/2003 |

OTHER PUBLICATIONS

Bridgwater et al, Fast pyrolysis processes for biomass, Renewable & Sustainable Energy Reviews, vol. 4, 1-73, 1999.*

* cited by examiner

*Primary Examiner*—Walter D Griffin
*Assistant Examiner*—Natasha Young
(74) *Attorney, Agent, or Firm*—Crowell & Moring LLP

(57) ABSTRACT

The invention relates to a catalytic reactor (1) with a compact construction, whose assembly prevents the biomaterial present in said reactor from fusing together and causing a malfunction. The reactor is characterized in that it is arranged vertically and consists of a reactor tube (2) and an internal tube (5). This forms an annular gap (7), across which the biomaterial to be treated is conducted from a mixing vat (3) to a conversion coal collector (4). The biomaterial is catalytically decomposed in the mixing vat (3) and the reactor tube (2) as a result of the supplied heat. The gas that forms is evacuated by a gas vent (10). The residual conversion coal is collected in the conversion coal collector (4) and is partially returned to the mixing vat (3) via a screw conveyor (6) in the internal tube (5).

20 Claims, 2 Drawing Sheets

CATALYTIC REACTOR

Figure 1:
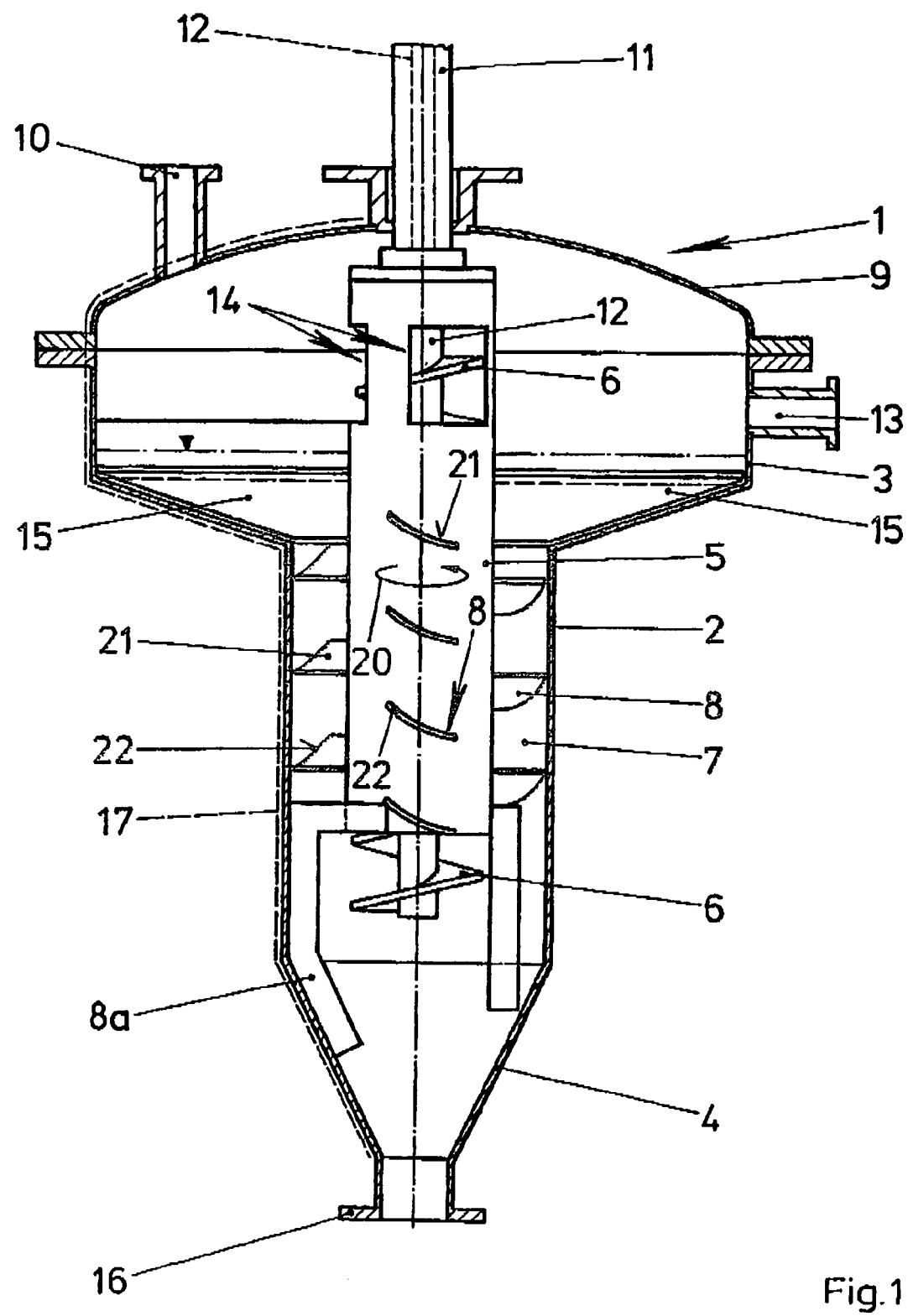

The invention relates to a catalytic reactor, especially a thermocatalytic reactor with a reactor pipe having a feed arrangement located at a beginning of the reactor pipe for the supply of organic material to the reactor pipe which is transported through the reactor pipe by way of a conveyor system and thereby catalytically decomposed, whereby the char produced thereby is removed by a removal arrangement located at an end of the reactor pipe, and with a recirculating arrangement which recirculates at least a portion of the char as catalytic material to the beginning of the reactor pipe.

Such a reactor is known, for example, from U.S. Pat. No. 4,781,796.

This reactor is used for the thermocatalytic gasification of organic material (biomaterial) such as, for example, sewage sludge whereby the biomaterial is slowly heated with the exclusion of air to a conversion temperature of 200 to 600° C. and thereby in large part gasified. The remaining material is char. Crude oil can be generated from the separated gas, among other things. In such a thermocatalytic conversion, the trace elements present in the biomass such as, for example, copper, cobalt and aluminum silicates serve as catalysts.

Such reactors can in principle also be used for anaerobic fermentation, for example for the cleaning of industrial waste water or agricultural residues. However, the operating temperature is thereby only about 35° C.

The reactor according to U.S. Pat. No. 4,781,796 includes for this a horizontal reactor pipe through which the organic biomaterial to be treated is transported initially by an auger and then with several paddles which do not contact the interior mantel surface of the reactor pipe and thereby exclusively serve the transport of the material.

The biomaterial to be processed is only found in the bottom region of the pipe and is brought to the corresponding decomposition temperature by way of a heating arrangement positioned external to the pipe. The heat transfer is limited to the floor surface covered by the biomaterial. A higher filling of the pipe is not possible, since the biomaterial has a tendency to cake and the conveyor system is then no longer in the position to transport compacted and caked together biomaterial through the reactor pipe. The through-put through horizontal pipes is therefore principally limited.

The invention is therefore based on the problem to provide a catalytic reactor which has a high through-put and a long residence time, while caking of the biomaterial and clogging of the reactor pipe are prevented.

For the solution of this problem, the invention provides a catalytic reactor according to the preamble of claim 1 with the additional features that the reactor is positioned upright and has an inner pipe concentrical to the reactor pipe, whereby the organic material is transported from the top down in the annular gap formed between the reactor pipe and the inner pipe.

The term "upright" relates in particular to a vertical arrangement; however oblique orientations of the reactor pipe in which gravity contributes to the transport of biomass through the reactor pipe are also included.

Two objects are achieved with this arrangement. First, it is possible due to this vertical arrangement to evenly distribute the biomaterial along the inner circumference of the reactor pipe, so that the whole mantel surface of the reactor pipe can serve as heat transfer surface and the biomaterial therefore can be heated evenly from all sides. Since furthermore the material distribution in the reactor pipe is limited to the annular gap, the heat transfer in radial direction is limited to the width of the gap. Even biomaterial which is close to the inner pipe, which means away from the outer pipe and therefore from the heating, is still heated to a sufficient degree. Secondly, since the biomaterial is furthermore moved by its own weight through the reactor pipe, the conveyor system can be constructed in such a way that it is able to loosen up the biomaterial and thereby prevent its compacting and caking.

The catalytic process decomposes the organic material to a large degree. A char remains which is recirculated and added to the biomaterial supplied to the reactor. The char has several functions:

The catalytically active trace elements are bonded to it and are recirculated together with it so that they are available as catalysts to the biomaterial newly added to the reactor, so that the char can be considered a catalyst.

The char binds the compounds liquefied during the conversion, for example fats.

It thins out the biomaterial fed into the reactor and thereby creates a large phase interface between the biomass and the catalysts, whereby a high matter conversion rate is achieved.

The recombination of radicals is counteracted and the depolymerization of complex biomolecules with the formation of monomeric, small molecules is thereby supported.

The generation of tar-like products is counteracted.

The residence time of recirculated compounds connected with the char, such as, for example long-lived environmental chemicals and pharmaceuticals, is increased so that their decomposition rate is increased as well.

In the reactors known to date, the char is removed at the end of the reactor pipe and collected in a container. It is recirculated from there to the feed arrangement through a pipe system located external to the reactor.

In order to achieve a simplification, the invention further provides that the recirculation arrangement is positioned in the inner pipe. The recirculation of char is therefore carried out within the reactor. This results in a highly compact construction of the installation. Furthermore, the still warm char heats the reactor from the inside, which lowers the energy consumption of the installation.

Although the reactor is positioned vertically and the organic material to be treated and the added char therefor move through the reactor pipe under gravity, a transport arrangement is provided in the annular gap both for the support of the transport as well as for continuous loosening. This consists preferably of baffles which are mounted to the outer circumference of the inner pipe and reach all the way to the interior mantel surface of the reactor pipe, whereby the inner pipe can be slowly rotated by way of a drive. The advantage of the vertical arrangement is here again apparent. Since the organic material moves through the reactor pipe by way of gravity acting on the biomaterial, the baffles can be especially constructed in such a way that they loosen the biomaterial and mix it well with the char. This promotes the catalytic decomposition and gasification of the biomaterial. Since the baffles extend up to the outer circumference of the reactor pipe, they can act as scrapers or shavers which remove caked on material from the interior mantel surface of the reactor pipe. They are differentiated in this way from the paddles according to U.S. Pat. No. 4,781,796 which are solely used for transport of the material.

The recirculation of the char through the inner pipe is carried out by way of a transport auger which is operated in counter rotation to the interior pipe, which increases the transport speed despite a relatively slow rotation movement of the transport auger.

For supply of the reactor pipe with the organic material, the upper end of the reactor pipe is widened to a round mixing pan with a feed connection and a gas exhaust, in which at least one mixing baffle is provided. The mixing pan is downwardly conical and therefore acts like a funnel. The mixing baffle provides for a good mixing of the biomaterial and char, whereby, since the mixing pan is also heated, the reactor process is already initiated.

For the supplying of the char, the inner pipe extends into the mixing pan and is provided above the fill level of the mixing pan with windows through which the char, transported upwardly through the inner pipe, exits.

The feed connection is positioned laterally. The mixing baffles provide a good mixing of the char entering from the center and the biomaterial supplied laterally.

The mixing pan is at the top sealed airtight by a lid. A gas exhaust is provided thereat.

At the lower end of the reactor pipe, a funnel shaped char collector is provided into which the transport auger extends and which at its bottom includes a char extractor for the char.

Since only a portion of the produced char is required for enrichment of the biomaterial, the char not needed for the process can be removed at the char extractor. In order to avoid caking in the region of the collector, the last baffle in the reactor pipe is downwardly extended into the collector.

In order to achieve a good mixing in the annular gap of the reactor pipe, the baffles in the reactor pipe are positioned staggered along a helical line. The baffles are especially positioned obliquely and in particular have a scooped surface which is upwardly inclined in the direction of rotation. This achieves that the biomaterial is again and again lifted against the main direction of movement oriented toward the lower end of the reactor, whereby especially a compacting of the mass is avoided and a continuous loosening is achieved. This is promoted also in that the scooped surfaces are concavely curved.

In order that the baffles can act as scrapers, their outer edge is hardened and formed such that it follows a cylindrical line and thereby engages the interior mantel surface of the reactor pipe practically without gap.

In order to improve the heat transfer and achieve a further improvement of the mixing, the invention provides that disk-shaped regions of the annular gap are free of baffles and that stationary diverters mounted to the reactor pipe extend into these regions. These diverters readily transfer the heat of the reactor pipe further inward so that even close to the inner pipe a good and sufficient heating of the biomaterial is achieved.

A maximum fill level is provided for the mixing pan so that the feed connection is not closed and the load of the reactor with biomaterial does not become too high, and especially so that the exit windows for the char remain free. In order to maintain it, a fill level monitoring arrangement is provided in the mixing pan. The fill level can be controlled through the amount of added organic material and through the amount of char removed at the lower end of the reactor. In order to achieve that, a valve is provided there which is controlled by the fill level monitoring arrangement.

The invention relates to a reactor wherein independent of its orientation an internal recycling of the char is carried out. This provides especially for the advantage that the recirculation can be controlled in a simple manner and that the heat energy stored in the char heats the reactor from within.

Figure 2:
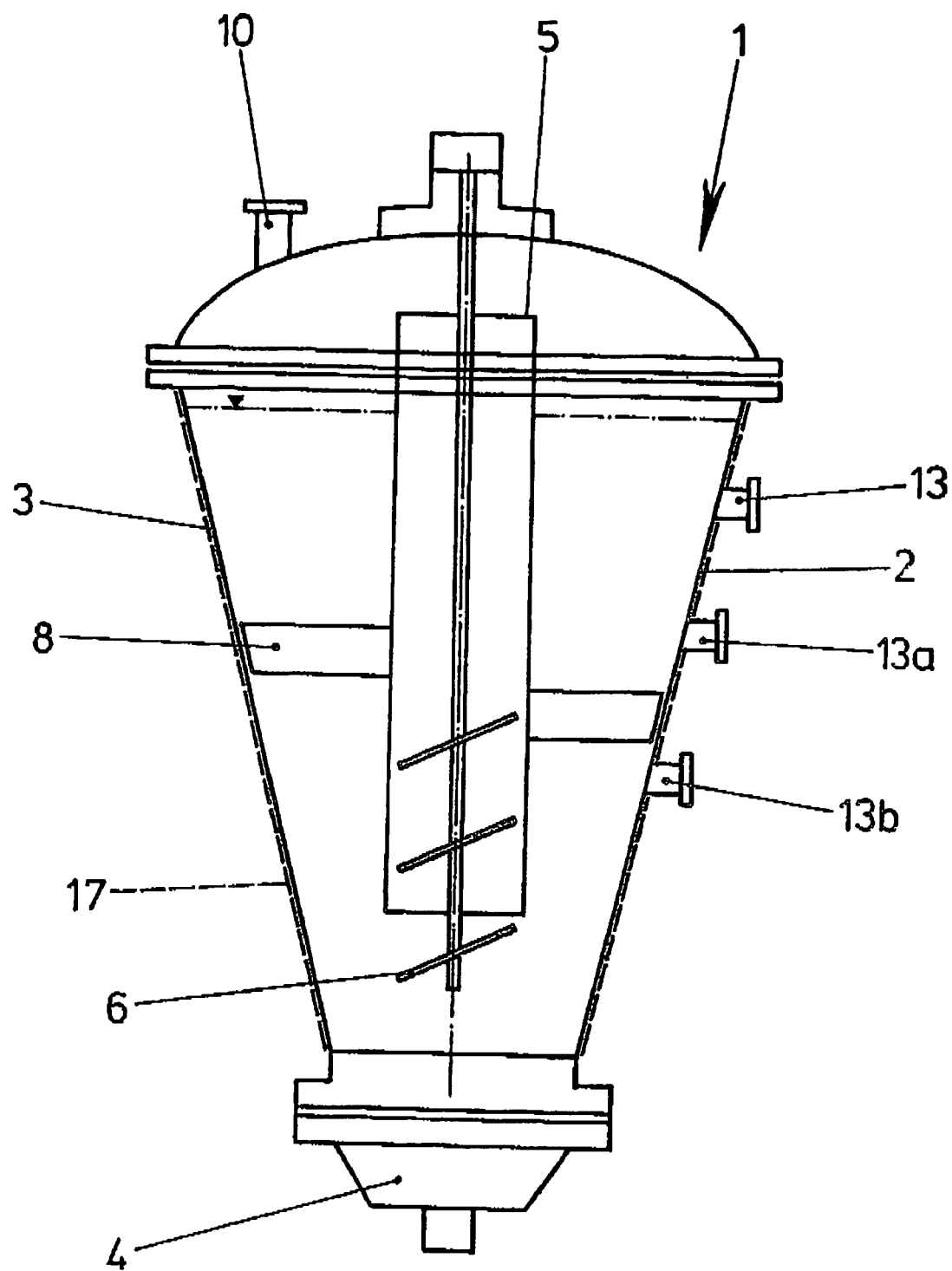

The invention will be further described in the following by way of an exemplary embodiment. For further illustration, it is shown in:

FIG. 1 a longitudinal section through a catalytic reactor according to the invention in a first embodiment; and FIG. 2 a longitudinal section through a catalytic reactor according to the invention in a second embodiment.

A catalytic reactor 1 consists of a vertically oriented reactor pipe 2 which is widened at the upper end to a mixing pan 3. A funnel shaped char collector 4 is provided at its lower end. An inner pipe 5 is positioned concentrical to the reactor pipe 2 which extends over the length of the reactor pipe 2 and the mixing pan 3. A transport auger 6 is positioned in the inner pipe 5 which extends into the char collector 4.

According to the first embodiment (FIG. 1), the reactor pipe 2 is cylindrically constructed and the mixing pan 3 is significantly wider. A second embodiment (FIG. 2) provides that the reactor pipe 2 upwardly continuously widens, especially conically, and that the mixing pan 3 continuously connects thereto in continuance of the shape of the reactor pipe. An embodiment not illustrated here provides that the reactor pipe and the mixing pan consist of a continuously cylindrical pipe.

The reactor pipe 2 and the inner pipe 5 together define an annular gap 7 through which the organic material to be treated moves from the top down. In order to promote this movement and to simultaneously loosen up the biomaterial and to avoid compacting which leads to caking, baffles 8 are mounted to the inner pipe 5, which extend over the width of the annular gap 7.

The mixing pan 3 is closed by a lid 9. A gas exhaust 10 is provided thereon; furthermore a sealed passage for a hollow shaft 11 for the drive of the inner pipe 5 and positioned therewith a drive shaft 12 for the transport auger 6 is provided. The mixing pan 3 further includes a lateral feed connection 13 for the organic material to be decomposed.

The char is transported upward through the inner pipe 5 by way of the transport auger 6 and exits through windows 14 to fall into the mixing pan 3. For a good mixing of the char and the biomaterial, at least one mixing baffle 15 is provided in the mixing pan 3, which is mounted to the inner pipe 5 and reaches all the way to the wall of the mixing pan 3 to engage it without gap. The mixing baffle 15 has the function to on the one hand mix char and material and on the other hand to scrape off cakings from the inside of the mixing pan 3.

In order to guide the char exiting from the annular gap 7 in the region of the char collector 4 to the region of the transport auger 6, the last baffle 8a is downwardly extended and reaches into the char collector 4. A char extractor 16 is located at the lower end of the char collector 4 with a slide valve not illustrated in detail which can be opened and closed controlled by the fill level.

As already mentioned, baffles 8 are provided in the annular gap 7. They are preferably positioned along a helical line. They are, as shown in the Figure, oriented obliquely upward relative to the direction of rotation (arrow 20) of the inner pipe 5, whereby they have a convexly curved scooped surface 21. The biomaterial is lifted again and again by the individual baffles 8 against the main direction of movement toward the lower end of the reactor pipe 2. This counteracts caking. Biomaterial adhered to the interior mantel surface of the reactor pipe 2 is scraped off by the optionally hardened outer edges of the baffles 8.

A heating mantel 17 (broken line) is provided about the whole device. It extends from the char collector past the reactor pipe 2 to the mixing pan 3 and its lid 9. It provides for a heating of the biomaterial in the system to the temperature necessary for the decomposition. Many different techniques can be used for the heating. Electrical heating as well as gas heating have proven advantageous. The heating of the char collector 4 also has the advantage that the collected char remains at a high temperature and that its heat is transferred by way of the inner pipe 5 to the biomaterial to be processed in the annular gap 7. This provides for an even heating of the biomaterial.

A further gas exhaust—here not further illustrated—is positioned at the lower end of the reactor pipe 2. Gases dragged along by the biomaterial can be collected and removed herewith.

To carry out the generally known process, the biomaterial to be catalytically decomposed is placed into the mixing pan 3 through the feed connection 13. There, it is mixed with the char exiting from the window 14, whereby already a catalytic conversion to gas occurs. This gas reaches the gas exhaust 10 and can be transported from there to a further processing. The mixing baffle 15 provides an intimate mixing of the char and the biomaterial. Mixed in this way, it reaches the annular gap 7 between the reactor pipe 2 and inner pipe 5. The baffles 8 provide for a continuous loosening and mixing of the biomaterial. By way of the added heat, the biomaterial is further gasified until at the end of the reaction pipe 2 only char is present which is collected in the char collector 4 and partly recirculated to the mixing pan 3 by way of a transport auger 6. In order to achieve a defined fill level therein, the char extractor 16 is provided with a controllable valve. By removal of char, after opening of the valve, the fill level is lowered and by closing of the valve it is raised.

The further embodiments illustrated in more detail in FIG. 2 can be generally employed according the invention:

Further feed connections 13a, 13b can be provided laterally on the reactor pipe which are respectively associated with different levels in the reactor pipe 2. This provides for a good possibility to influence the layering. In particular, the layering can be structured in such a way that zones of higher char content alternate with zones of higher unconverted biomass content.

It is further possible to select a certain feed-in level depending on the concentration of the biomass added.

In particular, the uppermost feed connection 13 can be provided below the level in the mixing pan 3. This results in a layering in the mixing pan 3 with the upper layer consisting of char acting like an active filter for the gas to be removed upwardly.

A gas exhaust with an overpressure valve should be provided at the lower end of the reactor pipe so that no overpressure is formed in case the biomass in the reactor pipe should cake into a plug.

The mixing ratio to the biomass can be adjusted pretty exactly with a controlled recirculation of the char. Since the mixing ratio, depending on the type of the added biomaterial, influences the type and quality of the educts of the reactor, it is therefore easily possible to influence it by accordingly adjusting the speed of rotation of the recirculation auger.

The invention claimed is:

1. A catalytic reactor comprising a heatable reactor pipe with a feed arrangement located at a beginning of the reactor pipe for the supply to the reactor pipe of organic material which is transported through the pipe by way of a conveyor system and thereby catalytically decomposed; a removal arrangement located at an end of the reactor pipe to remove char generated by the catalytic decomposition; and a recirculation arrangement which recirculates at least a part of the char as catalytic material to the beginning of the reactor pipe; wherein the reactor is oriented upright and has an inner pipe concentric with the reactor pipe, whereby the organic material is transported from the top down through an annular gap defined between the reactor pipe and the inner pipe, and the recirculation arrangement is positioned in the inner pipe.

2. A catalytic reactor according to claim 1, wherein the transport arrangement is in the form of baffles mounted on the outer 3. A catalytic reactor according to claim 2, further comprising a transport auger extending in the inner pipe which is driven in a direction opposite to the inner pipe. circumference of the inner pipe and extending to an interior mantel surface of the reactor pipe, and the inner pipe is slowly rotatable.

4. A catalytic reactor according to claim 3, wherein a funnel-shaped char collector is connected to the lower end of the reactor pipe, the transport auger extends into the funnel-shaped char collector, and the funnel-shaped char collector has a char extractor for the char at its bottom.

5. A catalytic reactor according to claim 4, wherein a last baffle in the reactor pipe is extended downward and extends into the char collector.

6. A catalytic reactor according to claim 4, wherein the baffles in the reactor pipe are positioned along a helical line.

7. A catalytic reactor according to claim 4, wherein the baffles have a scooped surface oriented obliquely upward in the direction of rotation of the inner pipe.

8. A catalytic reactor according to claim 4, wherein the scooped surfaces are concavely curved.

9. A catalytic reactor according to claim 4, wherein the outer edges of the baffles follow a cylindrical line and are constructed as scrapers.

10. A catalytic reactor according to claim 4, further comprising a fill level monitoring arrangement disposed in the mixing pan and wherein the char extractor for the char is controlled by a valve.

11. A catalytic reactor according to claim 6, wherein the baffles have a scooped surface oriented obliquely upward in the direction of rotation of the inner pipe.

12. A catalytic reactor according to claim 1, further comprising a transport auger extending in the inner pipe which is driven in a direction opposite to the inner pipe.

13. A catalytic reactor according to claim 1, wherein the upper end of the reactor pipe is widened to a round mixing pan which has a feed connection, a gas exhaust, and at least one mixing baffle.

14. A catalytic reactor according to claim 13, wherein the inner pipe extends into the mixing pan and has a window through which the char exits by being conveyed upward through the inner pipe.

15. A catalytic reactor according to claim 1, wherein disk-shaped regions of the annular gap are free of baffles and stationary diverters mounted on the reactor pipe extend into these regions.

16. A catalytic reactor comprising a reactor pipe with a feed arrangement positioned at the beginning of the reactor pipe for supplying organic material to the reactor pipe, said organic material being transported through the pipe by way of a conveyor system and thereby catalytically decomposed, a removal arrangement positioned at an end of the reactor pipe to remove char generated by the catalytic decomposition; and a recirculation arrangement which recirculates at least a portion of the char as catalytic material to the beginning of the reactor pipe wherein the reactor has an inner pipe concentric with the reactor pipe, whereby the organic material is transported from the top down through an annular gap defined between the inner pipe and the reactor pipe and char is recirculated through the inner pipe.

17. A catalytic reactor according to claim 16, which is vertically oriented.

18. A catalytic reactor according to claim 1, wherein the reactor pipe is upwardly widened.

19. A catalytic reactor according to claim 18, wherein the reactor pipe (2) is upwardly conically widened.

20. A catalytic reactor according to claim 1, wherein the reactor pipe has a plurality of feed connections located one above another.

* * * * *